(12) United States Patent
Ishikawa et al.

(10) Patent No.: US 7,853,378 B2
(45) Date of Patent: Dec. 14, 2010

(54) CONTROL DEVICE FOR ELECTRICAL POWER STEERING SYSTEM

(75) Inventors: Hiroshi Ishikawa, Nagoya (JP); Noriyuki Ido, Chita-gun (JP); Jirou Hayashi, Ama-gun (JP); Kazuhiro Ichikawa, Kariya (JP); Hiroyuki Ukai, Nagoya (JP); Yoshifumi Morita, Nagoya (JP); Makoto Iwasaki, Nagoya (JP); Nobuyuki Matsui, Nagoya (JP); Kentaro Torii, Toyokawa (JP)

(73) Assignees: Denso Corporation, Kariya, Aichi-pref. (JP); National University Corporation Nagoya Institute of Technology, Nagoya, Aichi-pref. (JP)

( * ) Notice: Subject to any disclaimer, the term of this patent is extended or adjusted under 35 U.S.C. 154(b) by 987 days.

(21) Appl. No.: 11/700,956

(22) Filed: Feb. 1, 2007

(65) Prior Publication Data

US 2007/0192005 A1    Aug. 16, 2007

(30) Foreign Application Priority Data

Feb. 9, 2006 (JP) ............................ 2006-031898
May 26, 2006 (JP) ............................ 2006-147347

(51) Int. Cl.
*A01B 69/00* (2006.01)
*B62D 6/00* (2006.01)
*B62D 15/00* (2006.01)

(52) U.S. Cl. ............................ 701/41; 701/42; 701/43; 701/44; 701/45

(58) Field of Classification Search ........................ None
See application file for complete search history.

(56) References Cited

U.S. PATENT DOCUMENTS

| | | | | |
|---|---|---|---|---|
| 5,251,135 A * | 10/1993 | Serizawa et al. | ............... | 701/42 |
| 5,828,972 A * | 10/1998 | Asanuma et al. | ............... | 701/41 |
| 6,079,513 A * | 6/2000 | Nishizaki et al. | ............ | 180/402 |
| 6,097,286 A * | 8/2000 | Discenzo | .................... | 340/465 |
| 6,155,377 A * | 12/2000 | Tokunaga et al. | ........... | 180/446 |
| 6,208,923 B1 * | 3/2001 | Hommel | ...................... | 701/42 |
| 6,219,604 B1 * | 4/2001 | Dilger et al. | .................. | 701/41 |
| 6,367,577 B2 * | 4/2002 | Murata et al. | ............... | 180/446 |
| 6,505,703 B2 * | 1/2003 | Stout et al. | .................. | 180/446 |
| 6,527,079 B2 * | 3/2003 | Takeuchi et al. | ............ | 180/443 |
| 6,923,288 B2 * | 8/2005 | Szabela | ...................... | 180/402 |
| 2004/0088093 A1 * | 5/2004 | Yao et al. | ....................... | 701/44 |

FOREIGN PATENT DOCUMENTS

JP    A-2004-314767    11/2004
JP    A-2005-247214    9/2005

OTHER PUBLICATIONS

Kentaro Torii, Thesis dated Feb. 3, 2006 with partial English translation.

* cited by examiner

*Primary Examiner*—Khoi Tran
*Assistant Examiner*—Bhavesh V Amin
(74) *Attorney, Agent, or Firm*—Nixon & Vanderhye PC (57) ABSTRACT

In a steering system having a variable gear transmission system and an electrical power steering system, respective compensation amounts for first and second electric motors are produced by a first mathematical model. The compensation amounts are added to command values (v1, v2) to generate final command signals ($i_{gref}$, $i_{pref}$) to the respective electric motors. According to the above structure and operation, a mutual interference between two control systems can be suppressed.

3 Claims, 8 Drawing Sheets

DYNAMIC EQUATION FOR EPS+VGTS

$$\begin{bmatrix} J_s+J_{gr}+J_{gs} & J_{gr} & 0 \\ J_{gr} & J_{gr} & 0 \\ 0 & 0 & J \end{bmatrix} \begin{bmatrix} \ddot{\theta}_s \\ \ddot{\theta}_g \\ \ddot{\theta}_o \end{bmatrix} + \begin{bmatrix} C_s & 0 & 0 \\ 0 & C_{gr} & 0 \\ 0 & 0 & C \end{bmatrix} \begin{bmatrix} \dot{\theta}_s \\ \dot{\theta}_g \\ \dot{\theta}_o \end{bmatrix} + \begin{bmatrix} K_T & K_T & -K_T \\ K_T & K_T & -K_T \\ -K_T & -K_T & K \end{bmatrix} \begin{bmatrix} \theta_s \\ \theta_g \\ \theta_o \end{bmatrix} = \begin{bmatrix} T_s \\ n_1 K_{tr} i_{gref} \\ n_2 K_{tr} i_{aref} \end{bmatrix}$$

WHEREIN
$$J = J_o + n_2^2 J_m + \left(\frac{P}{2\pi}\right)^2 M_L$$
$$C = C_o + n_2^2 C_m + \left(\frac{P}{2\pi}\right)^2 C_L$$
$$K = K_T + \left(\frac{P}{2\pi}\right)^2 K_L$$

FIG. 3B

| | | | |
|---|---|---|---|
| $J_s$ | MOMENT OF INERTIA IN STEERING SYSTEM | $J_{gs}$ | MOMENT OF INERTIA FOR STATOR OF MOTOR 1 |
| $J_{gr}$ | MOMENT OF INERTIA FOR ROTOR OF MOTOR 1, INCLUDING GEAR RATIO | $J_o$ | MOMENT OF INERTIA FOR OUTPUT SHAFT |
| $J_m$ | MOMENT OF INERTIA FOR MOTOR 2 | $M_L$ | MASS OF RACK |
| $C_s$ | VISCOUS FRICTION COEFFICIENT IN STEERING SYSTEM | $C_{gr}$ | VISCOUS FRICTION COEFFICIENT OF MOTOR 1 |
| $C_o$ | VISCOUS FRICTION COEFFICIENT OF OUTPUT SHAFT | $C_m$ | VISCOUS FRICTION COEFFICIENT OF MOTOR 2 |
| $C_L$ | VISCOUS FRICTION COEFFICIENT OF RACK | $K_T$ | SPRING CONSTANT OF TORSION BAR |
| $K_L$ | SPRING CONSTANT OF RACK | $n_1$ | SPEED REDUCTION RATIO OF MOTOR 1 |
| $n_2$ | SPEED REDUCTION RATIO OF MOTOR 2 | $P$ | SPECIFIC STROKE |
| $K_{tr}$ | TORQUE CONSTANT | $\theta_g$ | ROTATION ANGLE OF MOTOR 1 |
| $\theta_s$ | STEERING ANGLE OF STEERING WHEEL | $\theta_o$ | ROTATION ANGLE OF OUTPUT SHAFT |
| $\theta_p (=n_2\theta_o)$ | ROTATION ANGLE OF MOTOR 2 | $T_s$ | STEERING TORQUE OF STEERING WHEEL |
| $T_{sn}$ | DETECTED TORQUE AMOUNT | $i_{gref}$ | COMMAND SIGNAL TO MOTOR 1 |
| $i_{aref}$ | COMMAND SIGNAL TO MOTOR 2 | | |

FIG. 6A
(GEAR RATIO : 1)

FIG. 6B
(GEAR RATIO : 2)

FIG. 6C
(GEAR RATIO : 0.5)

FIG. 7A
(GEAR RATIO : 1)

FIG. 7B
(GEAR RATIO : 2)

FIG. 7C
(GEAR RATIO : 0.5)

FIG. 8A
(GEAR RATIO : 1)

FIG. 8B
(GEAR RATIO : 2)

FIG. 8C
(GEAR RATIO : 0.5)

FIG. 9A
(GEAR RATIO : 1)

FIG. 9B
(GEAR RATIO : 2)

FIG. 9C
(GEAR RATIO : 0.5)

CONTROL DEVICE FOR ELECTRICAL POWER STEERING SYSTEM

CROSS-REFERENCE TO RELATED APPLICATIONS

This application is based on Japanese Patent Application Nos. 2006-31898, which was filed on Feb. 9, 2006, and 2006-147347, which was filed on May 26, 2006, the disclosures of which are incorporated herein by reference.

FIELD OF THE INVENTION

The present invention relates to a control device for a variable gear transmission system and an electrical power steering system. In particular, the present invention relates to a control device for suppressing mutual interference between an electric motor of the variable gear transmission system and an electric motor of the electrical power steering system.

BACKGROUND OF THE INVENTION

According to recent technological trends for steering control, a control for a steering angle as well as a control for a power assisting steering have been incorporated in a vehicle, from a view point that a range for assisting vehicle travel will be enlarged to enhance comfort level, or that a range for supporting driver's intention will be enlarged to increase safety. A variable gear transmission system (VGTS) is known as one of those technologies, wherein a gear ratio between a steered angle of a vehicle wheel and a steering angle of a steering wheel is flexibly adjusted by an electric motor. Such system is generally incorporated in the vehicle together with an electrical power steering system, in which an auxiliary torque is generated by an electric motor to assist a steering operation of a vehicle driver. Such system is disclosed in, for example, Japanese Patent Publication Nos. 2001-287657 and 2005-247214.

In the steering system having the variable gear transmission system (VGTS) and the electrical power steering system, the electric motor for changing the gear ratio for the variable gear transmission system (VGTS) is independently provided in addition to the electric motor for generating the auxiliary torque for the electrical power steering system. As above, two control systems are provided for the common control subject (the steering system), which may cause the following problems.

At first, a mutual interference between two control systems may occur, because the control system for the variable gear transmission system (VGTS) and the control system for the electrical power steering system respectively control the same control subject (the steering system) by the respective electric motors. As a result, it is likely to cause deterioration of the operation sensitivity.

Secondly, the steering system may cause the deterioration of the operation sensitivity, because two independent electric motors are provided in the steering system, and thereby the moment of inertia which the vehicle driver could feel from the steering system will be increased. In particular, the moment of inertia of the electric motor for generating the auxiliary torque becomes larger and thereby the deterioration of the operation sensitivity will become marked, when the electrical power steering system is installed in a vehicle larger than a medium-sized vehicle having a large weight.

SUMMARY

The present exemplary embodiment is made in view of the above problems. It is an object of the present exemplary embodiment to provide a control device, which can improve the deterioration of the operation sensitivity to be caused by the mutual interference in the two control systems, even when the steering system has the variable gear transmission system and the electrical power steering system.

It is another object of the present exemplary embodiment to provide a control device, which suppress the deterioration of the operation sensitivity, even when two electric motors are provided in the steering system and the moment of inertia for the steering system is thereby increased as a whole.

According to a feature of the present exemplary embodiment, a steering for a vehicle comprises: a variable gear transmission system for changing a gear ratio ($\theta_o/\theta_s$) for a steered angle of a vehicle wheel with respect to a steering angle of a steering wheel, in accordance with a rotation angle ($\theta_g$) of a first electric motor; an electrical power steering system for generating an auxiliary steering torque by a second electric motor in accordance with a torque applied to a steering shaft device connected with the steering wheel; and a control device for controlling the variable gear transmission system and the electrical power steering system.

The control device may include a first calculating portion for setting a target gear ratio (z) for the variable gear transmission system, and for calculating a first command value ($v_1$) for the rotation angle of the first electric motor, such that an actual gear ratio coincides with the target gear ratio (z); and a second calculating portion for setting a target torque ($T_{snref}$) to be generated at the electrical power steering system, and for calculating a second command value ($v_2$) for the torque generated by the second electric motor, such that the auxiliary steering torque generated by the second electric motor coincides with the target torque ($T_{snref}$).

The control device may further include a first output portion for generating a first compensation amount based on a first mathematical model, so that an influence of the interference to be applied to the rotation angle ($\theta_g$) of the first electric motor is reduced when the second electric motor is driven by the second command value ($v_2$) calculated by the second calculating portion, the first output portion calculating a first compensation command signal ($i_{gref}$) by adding the first compensation amount to the first command value ($v_1$), so that the first compensation command signal ($i_{gref}$) is applied to the first electric motor; and a second output portion for generating a second compensation amount based on the first mathematical model, so that an influence of the interference to be applied to the torque ($T_{sn}$) of the steering shaft device is reduced when the first electric motor is driven by the first command value ($v_1$) calculated by the first calculating portion, the second output portion calculating a second compensation command signal ($i_{pref}$) by adding the second compensation amount to the second command value ($v_2$), so that the second compensation command signal is applied to the second electric motor.

As above, the first compensation amount is produced based on the first mathematical model, wherein the first compensation amount reduces an influence of interference which is generated by the operation of the second electric motor to the rotation of angle for the first electric motor. The first compensation amount is added to the command value for the first electric motor, so that the compensation command signal to the first electric motor is finally produced. At the same time, the second compensation amount is produced based on the first mathematical model, wherein the second compensation amount reduces an influence of interference which is generated by the first electric motor and applied to the torque of the steering shaft (wherein the torque of the steering shaft is a control subject of the second electric motor). The second compensation amount is added to the command value for the second electric motor, so that the compensation command signal to the second electric motor is finally produced. Accordingly, the mutual interference is reduced in the two independent control systems, i.e. the variable gear transmission system and the electrical power steering system. As a result, the deterioration of the operation sensitivity can be improved.

According to another feature of the present exemplary embodiment, the first and second compensation amounts are generated by substituting condition amounts of the steering system into the first mathematical model, wherein the condition amounts correspond to such condition amounts of the steering system from the steering wheel to a transmitting shaft for the vehicle wheel, and the condition amounts are represented by the steering angle ($\theta_s$) of the steering wheel, the rotation angle ($\theta_g$) of the electric motor, and a rotation angle of the transmitting shaft for the vehicle wheel.

According to the above feature, the first and second compensation amounts can be calculated by the first mathematical model, wherein the first and second compensation amounts respectively correspond to the mutual interference between two control systems, which is generated in the conventional system having the variable gear transmission system and the electrical power steering system. Therefore, the influence caused by the mutual interference can be reduced, by respectively adding the above compensation amounts to the first and second command values for the first and second electric motors.

Furthermore, the compensation amounts can be more accurately calculated, when differentiated figures for the steering angle of the steering wheel, the rotation angle of the electric motor, and the rotation angle of the transmitting shaft for the vehicle wheel are used for calculating the above first and second compensation amounts.

In addition, it is preferable that the first and second output portions calculate corrected amounts by substituting the first and second command values ($v_1$, $v_2$) calculated by the first and second calculating portions into a second mathematical model, and the first and second output portion calculate the first and second compensation command signal ($i_{gref}$, $i_{pref}$) by respectively adding the first and second compensation amounts to the above corrected amounts. As a result, the control device can reduce the influence of the mutual interference, which would be generated by the respective changing amounts of the rotation angle and torque, when the rotation angle of the first electric motor is changed by the first command value and the torque generated at the second electric motor is changed by the second command value.

According to a further feature of the present exemplary embodiment, the second calculating portion calculate the target torque ($T_{snref}$) by integrating the steering angle ($\theta_s$) of the steering wheel with a weight coefficient ($G_c(s)$), wherein the weight coefficient ($G_c(s)$) becomes larger as a steering speed of the steering wheel increases.

According to such feature, the target torque is corrected to be largely increased, when the steering wheel is quickly operated by the vehicle driver. As a result, the influence of inertia force by the moment of inertia can be reduced, even when the moment of inertia for the steering system becomes larger by installing two electric motors. On the other hand, when the steering wheel is slowly operated, the correction for the target torque is relatively small. Therefore, the target torque may not be necessarily corrected, because the influence of inertia force is fundamentally small.

BRIEF DESCRIPTION OF THE DRAWINGS

The above and other objects, features and advantages of the present invention will become more apparent from the following detailed description made with reference to the accompanying drawings. In the drawings:

FIG. 3A shows a dynamic equation for the steering system having the variable gear transmission system (VGTS) 10 and the electrical power steering system (EPS) 11;

FIG. 3B shows definitions for the respective parameters used in the dynamic equation;

DETAILED DESCRIPTION OF THE PREFERRED EMBODIMENTS

Figure 1:
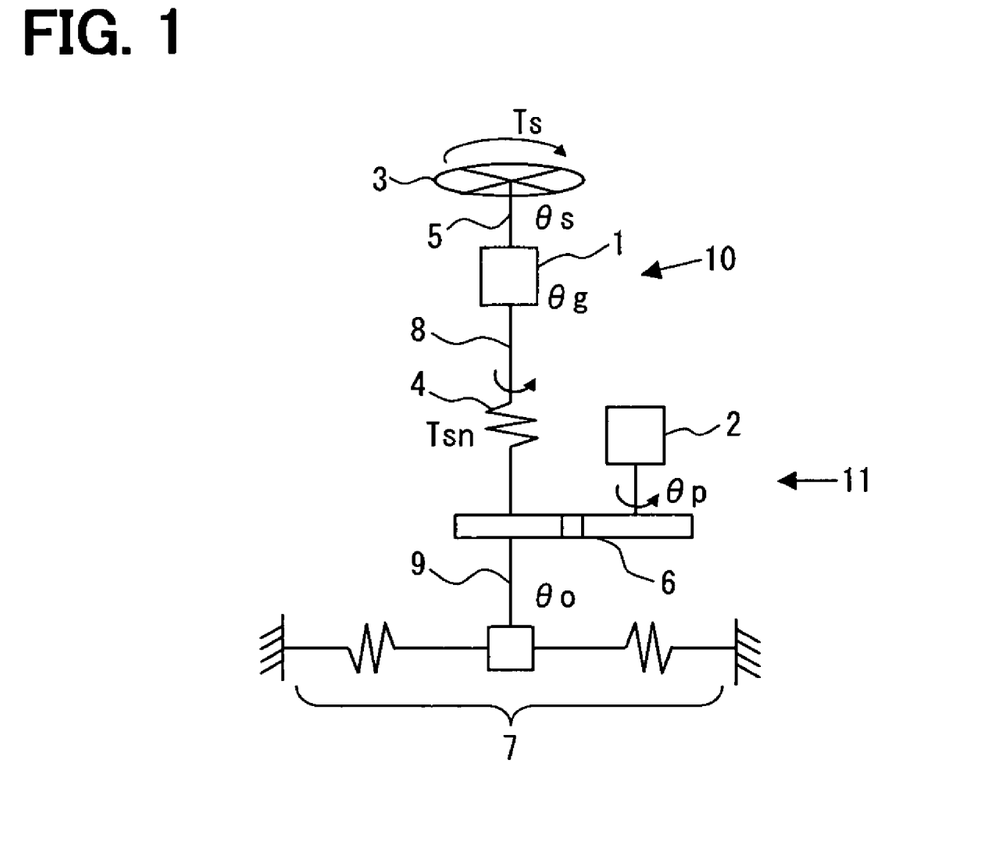
FIG. 1 is a model diagram showing a mechanical model of a three inertia system for a steering system, which comprises a variable gear transmission system (VGTS) and an electrical power steering system (EPS) according to an embodiment of the present invention.

An embodiment of the present invention will be explained with reference to the drawings. FIG. 1 is a model diagram, which shows a mechanical model of a three inertia system for a steering system according to an embodiment of the present invention, which comprises a variable gear transmission system (VGTS) and an electrical power steering system (EPS).

In FIG. 1, a steering input shaft 5 connected to a steering wheel 3 is connected to the variable gear transmission system 10. An output shaft 8 of the variable gear transmission system 10 connected to a pinion shaft 9 via a torque sensor 4, wherein the electrical power steering system 11 is provided to the pinion shaft 9. The pinion shaft 9 is connected to a rack shaft 7 via a rack-and-pinion steering gear. As above, the steering shaft device is composed of the steering input shaft 5, the output shaft 8, and the pinion shaft 9. The torque sensor 4 detects the torque "$T_{sn}$" applied to the steering shaft device.

Although not shown in the drawing, a pair of vehicle wheels (steering tires) is connected to each end of the rack shaft 7. Accordingly, when a rotational motion of the pinion shaft 9 is converted to a linear motion of the rack shaft 7, the left and right steering tires are steered by such an angle corresponding to a stroke of the linear motion of the rack shaft 7.

The variable gear transmission system 10 has a gear device (not shown) for connecting the steering input shaft 5 and the output shaft 8 with each other, and an electric motor 1 for driving the gear device. When the gear device is operated by a driving torque of the electric motor 1, a gear ratio "$\theta_o/\theta_s$" is changed in accordance with a rotation angle "$\theta_g$" of the electric motor 1. The gear ratio "$\theta_o/\theta_s$" means a ratio of the steered angle of the steering tires (i.e. vehicle front wheels), namely the rotation angle "$\theta_o$" of the pinion shaft 9, with respect to the steering angle "$\theta_s$" of the steering wheel 3.

A steering angle sensor (not shown) is provided at the steering input shaft 5 for detecting the rotation angle (i.e. the steering angle) "$\theta_s$" of the steering wheel 3. Another angle sensor (not shown) is likewise provided at the electric motor 1 for detecting the rotation angle "$\theta_g$" of the output shaft 8 of the electric motor 1.

The electrical power steering system 11 has another electric motor 2 for generating an auxiliary steering torque, and a speed reduction gear 6 for reducing the rotation of the electric motor 2 and transmitting the reduced rotation to the pinion shaft 9. The electrical power steering system 11 has a function for applying the auxiliary steering torque to the steering shaft device (5, 8, 9) when the electric motor 2 is driven. The auxiliary steering torque corresponds to the steering direction and the steering torque of the steering wheel 3.

An angle sensor (not shown) is also provided at the electric motor 2 for detecting the rotation angle "$\theta_p$" of the electric motor 2. The rotation angle "$\theta_p$" of the electric motor 2 has the following relation with the rotation angle "$\theta_o$" of the pinion shaft 9:

"$\theta_p = n_2 \theta_o$"

wherein "$n_2$" is a reduction ratio of the speed reduction gear 6.

Figure 2:
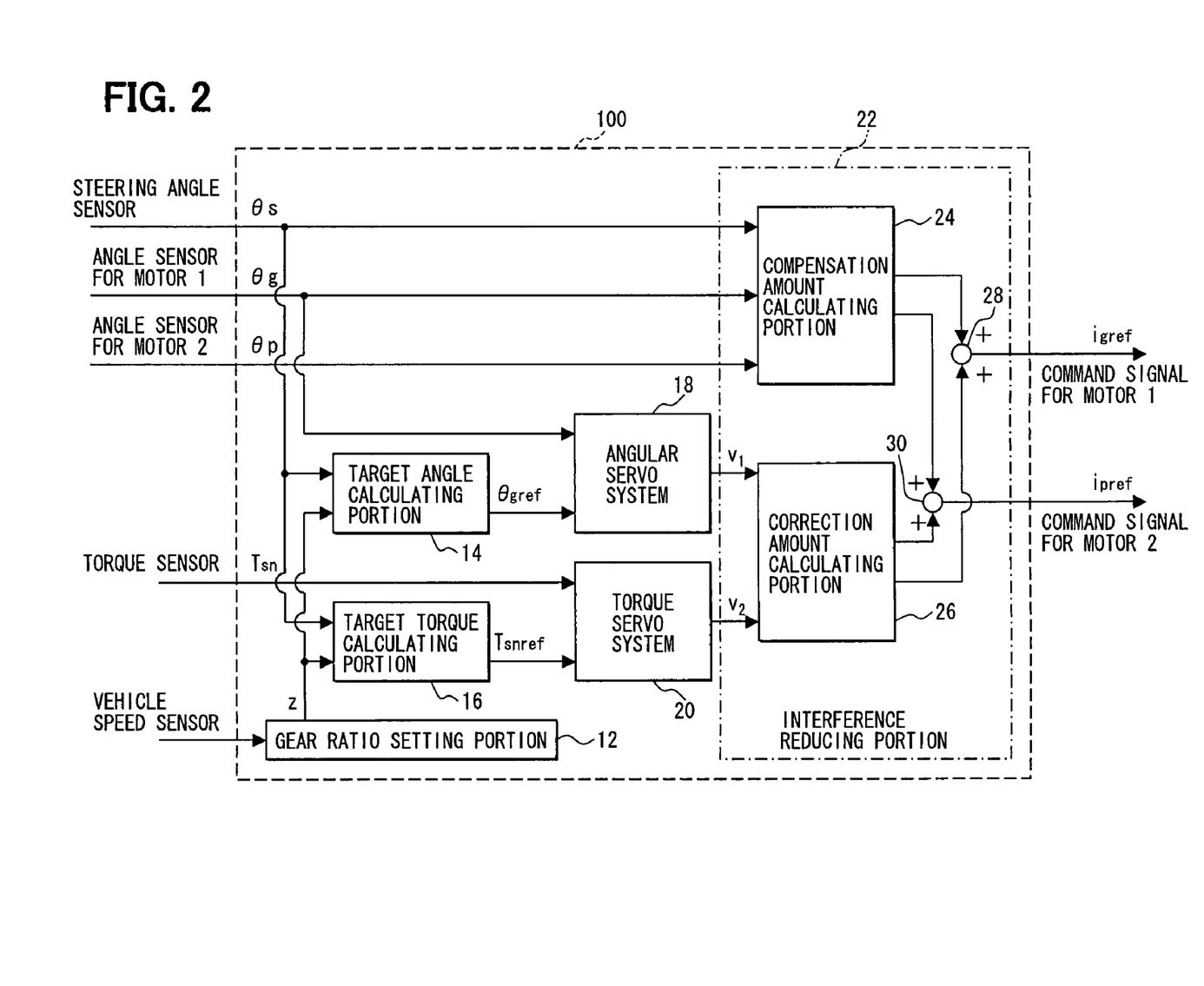
FIG. 2 is a block diagram for a control device 100 according to the embodiment of the invention.

A control device 100 for controlling the variable gear transmission system 10 and the electrical power steering system 11 will be explained. FIG. 2 is a block diagram for the control device 100 according to the embodiment of the present invention.

At first, a dynamic equation for the steering system having the variable gear transmission system 10 and the electrical power steering system 11, which is shown in FIG. 1, is made for the purpose of constituting the control device 100 of FIG. 2. The dynamic equation is shown in FIG. 3A, and the respective parameters used for the dynamic equation are indicated in FIG. 3B.

The control device 100 of the embodiment is based on the above dynamic equation. An interference reducing portion 22 is provided in the control device 100 for reducing a mutual interference between two control systems, i.e. the variable gear transmission system 10 and the electrical power steering system 11.

Figure 4:
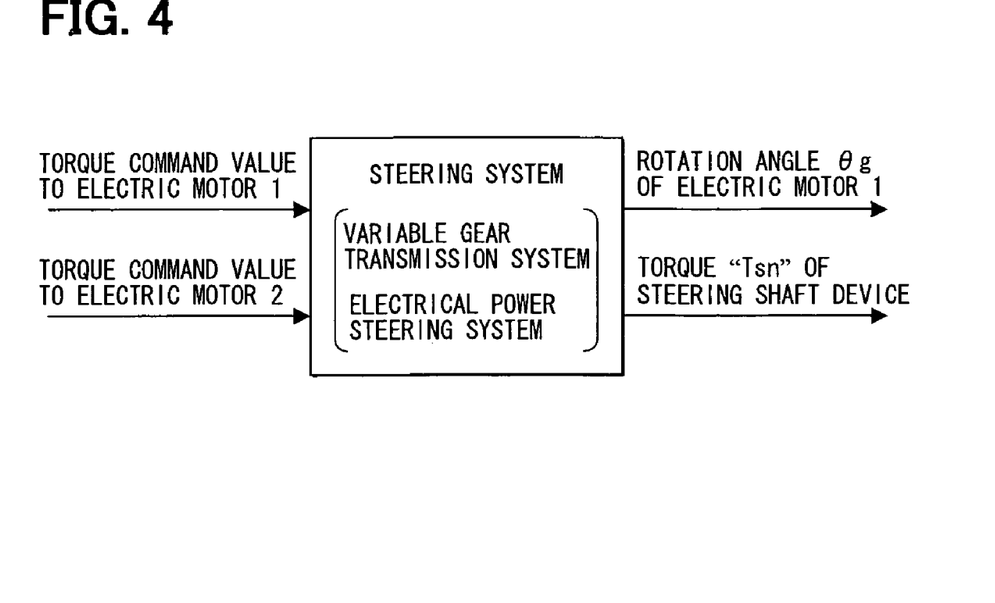
FIG. 4 is a block diagram, in case that the mechanical model of FIG. 1 was regarded as such a system having two inputs and two outputs.

More exactly, such a system having two inputs and two outputs, as is shown in FIG. 4, is considered in order to design the interference reducing portion 22, which reduces the mutual interference between two control systems, i.e. the variable gear transmission system 10 and the electrical power steering system 11.

In FIG. 4, the system (two inputs-two outputs) is formed from torque command values for the electric motors 1 and 2 to the respective control amounts, i.e. the rotation angle "$\theta_g$" of the electric motor 1 and the torque "$T_{sn}$" applied to the steering shaft device. In the system of FIG. 4, the steering torque "$T_s$" given by the vehicle driver is not taken into consideration. A design method for a decoupling control system is applied to the system of FIG. 4, so that one system from the torque command value for the electric motor 1 to its control amount of the rotation angle "$\theta_g$" of the electric motor 1 and the other system from the torque command value for the electric motor 2 to its control amount of the torque "$T_{sn}$" applied to the steering shaft device are so made not to interfere with each other.

The structure and the operation of the control device 100, including the interference reducing portion 22, will be explained below more in detail.

As shown in FIG. 2, inputted to the control device 100 are the steering angle "$\theta_s$" of the steering wheel 3, the rotation angle "$\theta_g$" of the electric motor 1, the rotation angle "$\theta_p$" of the electric motor 2 corresponding to the rotation angle "$\theta_o$" of the pinion shaft 9, the torque "$T_{sn}$" applied to the steering shaft device, and a signal of a vehicle speed detected by a vehicle speed sensor (not shown)

A gear ratio setting portion 12 sets a target gear ratio "z" in accordance with the vehicle speed inputted from the vehicle speed sensor, for example, based on a map prepared in advance. A target angle calculating portion 14 calculates a target angle "$\theta_{gref}$" for the electric motor 1, based on the target gear ratio "z" and the steering angle "$\theta_s$" of the steering wheel 3. For example, the target angle "$\theta_{gref}$" is calculated as an integrated value of the target gear ratio "z" and the steering angle "$\theta_s$", as indicated by the following formula 1:

$$\theta_{gref} = z \times \theta_s \qquad \text{<Formula 1>}$$

An angular servo system 18 calculates the command value "$v_1$" for the electric motor 1, in order to make zero a deviation between the target angle "$\theta_{gref}$" calculated by the target angle calculating portion 14 and the detected rotation angle "$\theta_g$" of the output shaft 8 rotated by the electric motor 1. The command value "$v_1$" is calculated as a command value for carrying out a PID-control, as indicated by the following formula 2:

$$v_1 = K_{P1}(\theta_{gref} - \theta_g) + K_{I1}\int(\theta_{gref} - \theta_g)dt + K_{D1}d/dt(\theta_{gref} - \theta_g) \qquad \text{<Formula 2>}$$

A target torque calculating portion 16 calculates a target torque "$T_{snref}$" in accordance with the steering angle "$\theta_s$" of the steering wheel 3 and the target gear ratio "z". The target torque "$T_{snref}$" is calculated according to the following formula 3:

$$T_{snref} = \left(G_1 - \frac{K1}{s}G_2 - \frac{K2}{s^2}G_3\right)\theta_s \qquad \text{< Formula 3 >}$$

wherein $$G_1 = \frac{2.653s + 2.333}{0.06631s + 1},$$

$$G_2 = \frac{3.553e4}{s^2 + 266.6s + 3.553e4},$$

$$G_3 = \frac{2527e5}{s^2 + 710.9s + 2.527e5}$$

$$K1 = 1.6,$$

$$K2 = (J_s + J_{gs} + J_{gr}) \times 0.25 + (z - 1) \times 0.7$$

The target torque "$T_{snref}$" may be alternatively calculated according to the following formula 4, which is a simplified formula:

$$T_{snref} = G_c(s)\theta_s \qquad \text{< Formula 4 >}$$

wherein $$G_c(s) = 40\frac{a(T_L s + 1)}{aT_L s + 1}$$

The target torque "$T_{snref}$" is calculated such that a weight corresponding to an operational frequency of the steering wheel 3 is added for the respective steering angle "$\theta_s$" of the steering wheel 3, when the target torque "$T_{snrsf}$" is calculated according to the above formula 3 or 4. More exactly, the target torque "$T_{snref}$" is calculated according to the formula 3 or 4, as an integrated value of a frequency weight "$G_c(s)$" and the steering angle "$\theta_s$", wherein the frequency weight "$G_c(s)$" becomes larger as a steering speed for the steering wheel 3 increases.

Figure 5:
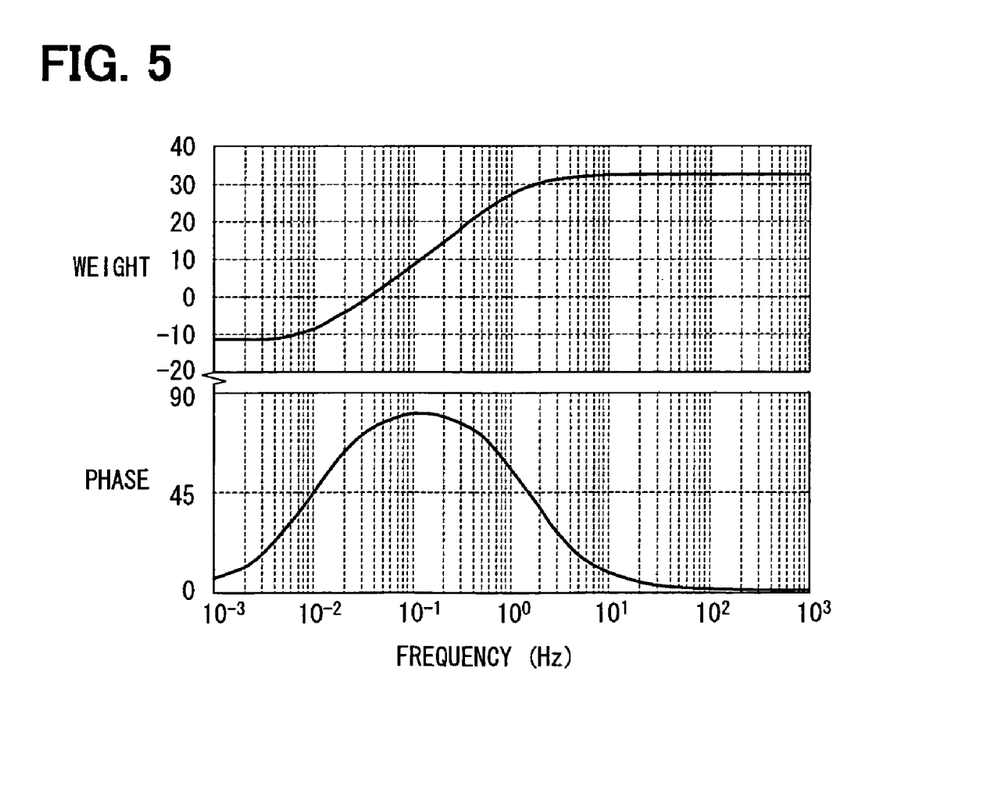
FIG. 5 is a characteristic diagram showing an example of characteristics for frequency gain of frequency weight "$G_c(s)$", which is used for calculating a target torque "$T_{snref}$"

One example of the frequency weight $G_c(s)$ in the formula 4 is shown in FIG. 5. As shown in FIG. 5, when the steering operation is slowly carried out, namely when the operational frequency of the steering wheel 3 is lower, the weight to be added decreases. The weight to be added is gradually increased, as the steering operation becomes faster, and thereby the operational frequency of the steering wheel 3 increases.

An operation sensitivity would be remarkably decreased due to an increase of moment of inertia, if moment of inertia in the steering system is increased by mounting two electric motors, or if such an electric motor having a large moment of inertia is used as the electric motor 2 for the electrical power steering system 11 of a medium-size vehicle, in particular when the steering wheel is quickly operated.

According to the embodiment of the present invention, however, as explained above, the weight to be added is changed in accordance with the operational frequency of the steering wheel 3 in order to overcome the above problem. As a result, the target torque "$T_{snref}$" is corrected to be largely increased, when the steering wheel is quickly operated by the vehicle driver, so that an influence of inertia force by the moment of inertia can be reduced. On the other hand, when the steering wheel is slowly operated, the correction for the target torque "$T_{snref}$" is relatively small or the target torque "$T_{snref}$" may not be corrected, because the influence of inertia force is fundamentally small.

A torque servo system 20 calculates the command value "$v_2$" for the electric motor 2, in order to make zero a deviation between the target torque "$T_{snref}$" calculated by the target torque calculating portion 16 and the torque "$T_{sn}$", which is detected by the torque sensor 4 and applied to the steering shaft device. The command value "$v_2$" is calculated as a command value for carrying out the PID-control, as indicated by the following formula 5:

$$v_2 = K_{P2}(T_{snref} - T_{sn}) + K_{I2}\int(T_{sref} - T_{sn})dt + K_{D2}d/dt(T_{snref} - T_{sn}) \qquad \text{<Formula 5>}$$

As above, the respective command values "$v_1$" and "$v_2$" are calculated by the angular servo system 18 and the torque servo system 20, so that an actual operating condition is controlled to be a target operating condition. The command values "$v_1$" and "$v_2$" are inputted to the interference reducing portion 22.

The interference reducing portion 22 has a compensation amount calculating portion 24, which calculates first and second compensation amounts in accordance with an operating condition of the steering system represented by the steering angle "$\theta_s$" of the steering wheel 3, the rotation angle "$\theta_g$" of the electric motor 1, and the rotation angle "$\theta_p$" of the electric motor 2. The compensation amount calculating portion 24 calculates the first and second compensation amounts based on a first mathematical model, for the purpose of compensating the mutual interference, which would be generated in the current operating condition, between the variable gear transmission system 10 and the electrical power steering system 11.

Namely, the compensation amount calculating portion 24 generates the first compensation amount based on the first mathematical model, so that the first compensation amount reduces the influence of the interference possibly applied to the rotation angle "$\theta_g$" of the electric motor 1 by the operation of the electric motor 2 in the current operating condition of the steering system. At the same time, the compensation amount calculating portion 24 likewise generates the second compensation amount based on the first mathematical model, so that the second compensation amount reduces the influence of the interference possibly applied to the torque of the steering shaft device (which is the controlled value for the electric motor 2) by the operation of the electric motor 1.

The interference reducing portion 22 has a correction amount calculating portion 26, which calculates respective correction command amounts in accordance with the command values "$v_1$" and "$v_2$" calculated by the angular servo system 18 and the torque servo system 20. The correction amount calculating portion 26 calculates the respective correction command amounts based on a second mathematical model, for the purpose of reducing the influence of the mutual interference, which would be generated by a changing amount of the rotation angle and torque, when the rotation angle of the electric motor 1 is changed by the respective command values "$v_1$" and "$v_2$" and the torque generated at the electric motor 2 is changed.

More exactly, the first and second mathematical models are indicated by the following formula 6, according to which the respective compensation amounts and correction command amounts are calculated by the compensation amount calculating portion 24 and the correction amount calculating portion 26:

$$u = Fx + Gv \qquad \text{<Formula 6>}$$

wherein $$u = \begin{bmatrix} n_1 K_{tr} i_g \\ n_2 K_{tr} i_a \end{bmatrix},$$

$$x = [\theta_s \ \theta_g \ \theta_o \ \dot{\theta}_s \ \dot{\theta}_g \ \dot{\theta}_o]^T,$$

$$v = \begin{bmatrix} v_1 \\ v_2 \end{bmatrix}$$

$F$ and $G$ are gain matrixes $$F = -B^{*-1}C^*$$

$$G = B^{*-1}$$

-continued $$B^* = \begin{bmatrix} (J_s + J_{gs} + J_{gr})/J_{gr}(J_s + J_{gs}) & 0 \\ -K_T/(J_s + J_{gs}) + \\ K_T(J_s + J_{gs} + J_{gr})/J_{gr}(J_s + J_{gs}) & -K_T/J \end{bmatrix}$$

$$C^* = \begin{bmatrix} -\dfrac{K_T}{J_{gr}} & -\dfrac{K_T}{J_{gr}} & \dfrac{K_T}{J_{gr}} & \dfrac{C_s}{J_s + J_{gs}} & -\dfrac{C_{gr}\left(J_s + J_{gs} + J_{gr}\right)}{J_{gr}(J_s + J_{gs})} & 0 \\ -\dfrac{K_T^2(J + J_{gr})}{JJ_{gr}} & -\dfrac{K_T^2(J + J_{gr})}{JJ_{gr}} & \dfrac{K_T^2(J + J_{gr})}{JJ_{gr}} & 0 & -\dfrac{K_T C_{gr}}{J_{gr}} & \dfrac{CK_T}{J} \end{bmatrix}$$

In the above formula 6, the first portion "Fx" in the formula for calculating a final torque command value "u" is a feedback portion for the operating condition amount "x" of the steering system, which is represented by the steering angle "$\theta_s$" of the steering wheel 3, the rotation angle "$\theta_g$" of the electric motor 1, and the angle "$\theta_o$" ($=\theta_p/n_2$) of the pinion shaft 9. Namely, the first and second compensation amounts (which reduce the mutual interference) are calculated from the first portion "Fx" based on the operating condition amount "x". The gain matrix "F" corresponds to the first mathematical model.

The second portion "Gv" in the formula for calculating the final torque command value "u" is a feedback portion for the command values "$v_1$" and "$v_2$", which are calculated by calculated by the angular servo system 18 and the torque servo system 20. Namely, the correction command amounts are calculated from the second portion "Gv", so that the command values "$v_1$" and "$v_2$" calculated by calculated by the angular servo system 18 and the torque servo system 20 are corrected to reduce the mutual interference. The gain matrix "G" corresponds to the second mathematical model.

The above first and second compensation amounts calculated at the compensation amount calculating portion 24 and the correction command amounts calculated at the correction amount calculating portion 26 for the electric motors 1 and 2 are added to each other at adding portions 28 and 30. And the added values become the command values "$i_{gref}$" and "$i_{pref}$" for the electric motors 1 and 2. As above, the torque command amounts to the electric motors 1 and 2 are given in a form of electric current.

A simulation is made to verify the availability of the above control device 100, wherein the simulation is made by use of physical parameters which are measured in a test bench using an actual vehicle. In the simulation, the following comparison examples 1 and 2 are compared with the embodiment of the present invention, in order to evaluate the operation sensitivity when the control device 100 controls the variable gear transmission system 10 and the electrical power steering system.

COMPARISON EXAMPLE 1

In the comparison example 1, the interference reducing portion 22 is eliminated from the control device 100. Furthermore, the target torque "$T_{snref}$" is calculated in such a way that a constant weight is used in the torque servo system 20 instead of the frequency weight $G_c(s)$.

COMPARISON EXAMPLE 2

In the comparison example 2, the interference reducing portion 22 is kept in the control device 100. However, the target torque "$T_{snref}$" is calculated in such a way that a constant weight is used in the torque servo system 20 instead of the frequency weight $G_c(s)$.

The wave forms of Lissajours figure, in which steering torques "$T_s$" and steering angles "$\theta_s$" are plotted in a phase plane, are used to evaluate the operation sensitivity. The gradient of the long axis for the wave forms of Lissajours figure is investigated to evaluate deteriorated degree of the operation sensitivity. It is evaluated that the operation sensitivity is good, when the gradient of the long axis is ever-increasing in a frequency range (0.2 Hz to 1.8 Hz) of the steering operation.

Figure 6A:
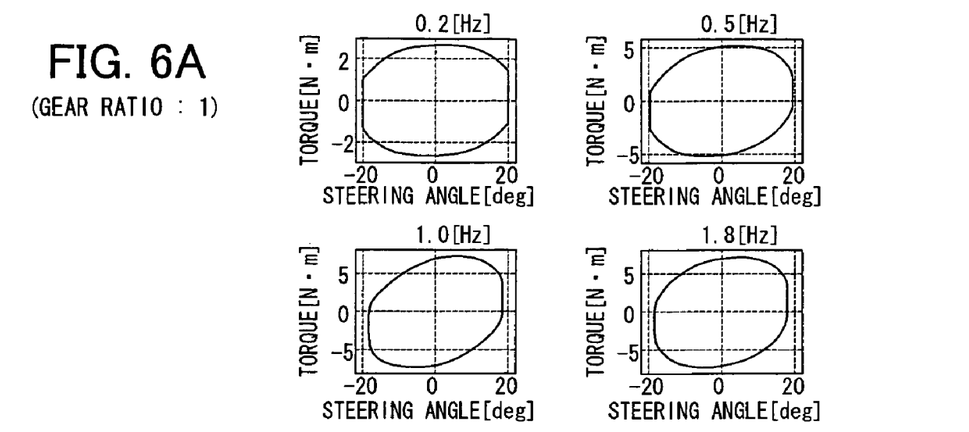
FIGS. 6A to 6C are graphs respectively showing wave forms of Lissajours figure, in which steering torques "$T_s$" and steering angles "$\theta_s$" are plotted in a phase plane, when the control device 100 of the present invention controls the variable gear transmission system 10 and the electrical power steering system 11 while the control device 100 calculates the target torque "$T_{snref}$" in accordance with the formula 4.
Figure 6B:
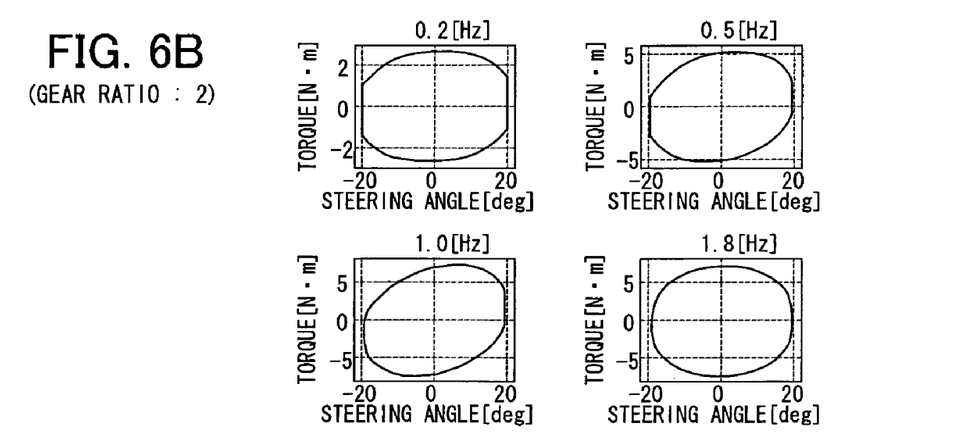
Figure 6C:
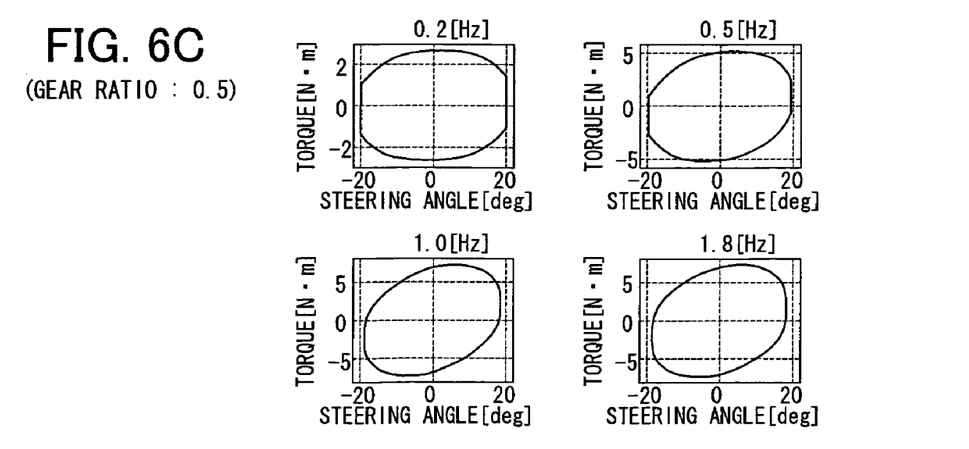

The wave forms of Lissajours figure are shown in FIGS. 6A to 6C, when the variable gear transmission system 10 and the electrical power steering system 11 are controlled by the control device 100 according to the embodiment of the present invention. In FIGS. 6A to 6C, the wave forms of Lissajours figure are shown, in the case that the target torque "$T_{snref}$" is calculated by the torque servo system 20 in accordance with the formula 4. It is understood from FIGS. 6A to 6C that each gradient of the long axes for the wave forms of Lissajours figure is ever-increasing in the above frequency range (0.2 Hz to 1.8 Hz) of the steering operation, independently from the gear ratio.

Figure 7A:
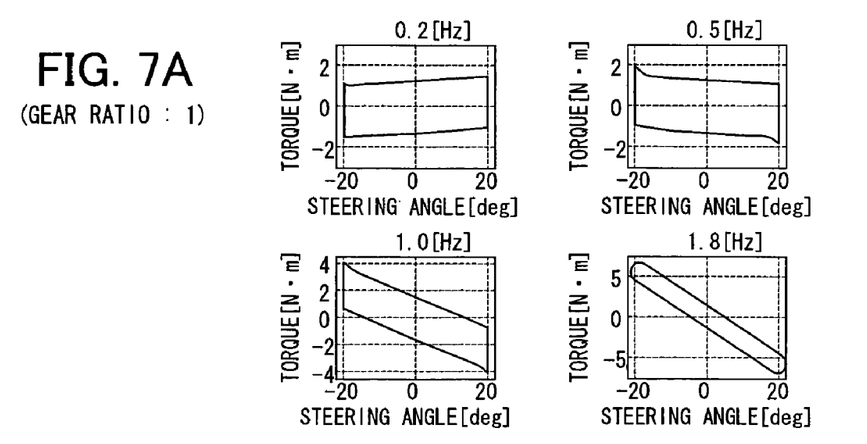
FIGS. 7A to 7C are graphs respectively showing wave forms of Lissajours figure, in which steering torques "$T_s$" and steering angles "$\theta_s$" are plotted in a phase plane, when a control device of a comparison example 1 controls the variable gear transmission system 10 and the electrical power steering system 11.
Figure 7B:
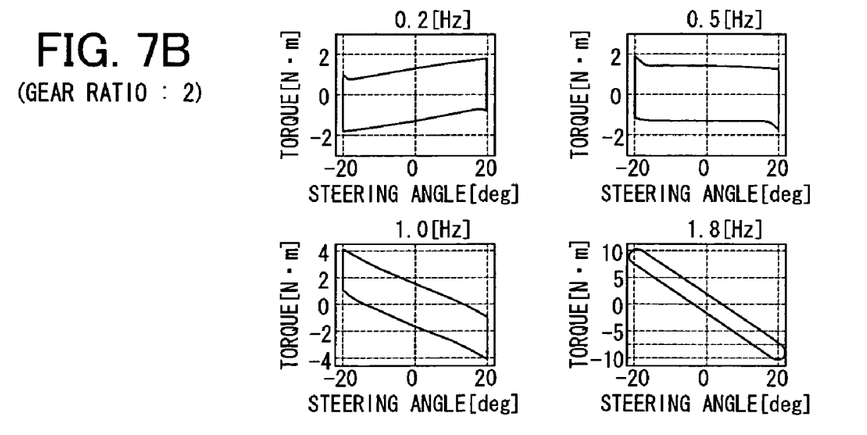
Figure 7C:
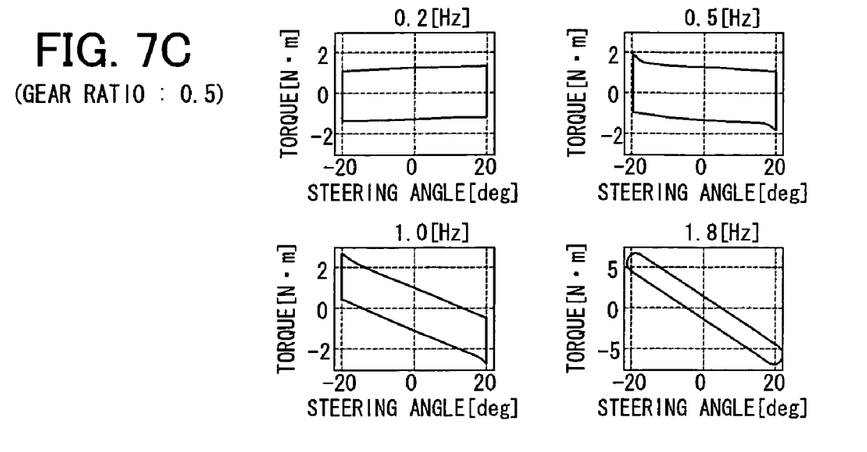

The wave forms of Lissajours figure are shown in FIGS. 7A to 7C, when the variable gear transmission system 10 and the electrical power steering system 11 are controlled by the control device of the comparison example 1. Since the control device of the comparison example 1 does not have the interference reducing portion 22, as explained above, each gradient of the long axes for the wave forms of Lissajours figure is changed from the ever-increasing form to the ever-decreasing form, as the steering frequency becomes higher. This means that the operation sensitivity is deteriorated.

Figure 8A:
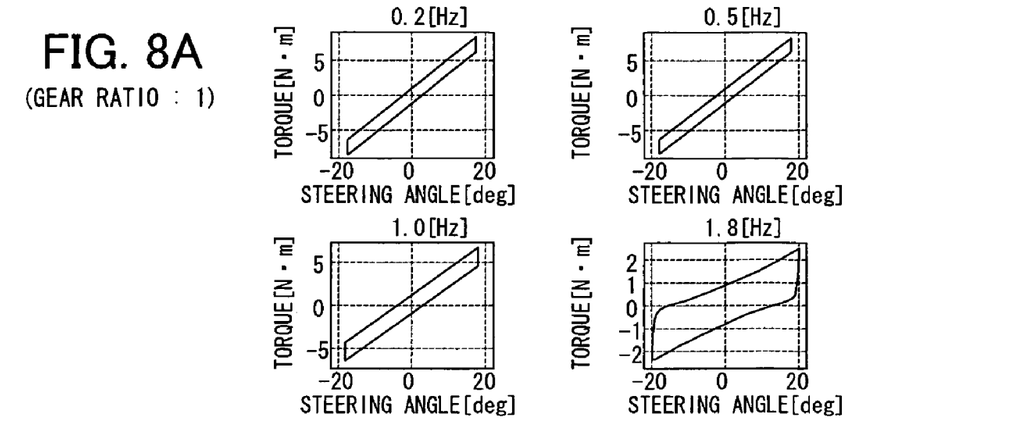
FIGS. 8A to 8C are graphs respectively showing wave forms of Lissajours figure, in which steering torques "$T_s$" and steering angles "$\theta_s$" are plotted in a phase plane, when a control device of a comparison example 2 controls the variable gear transmission system 10 and the electrical power steering system 11.
Figure 8B:
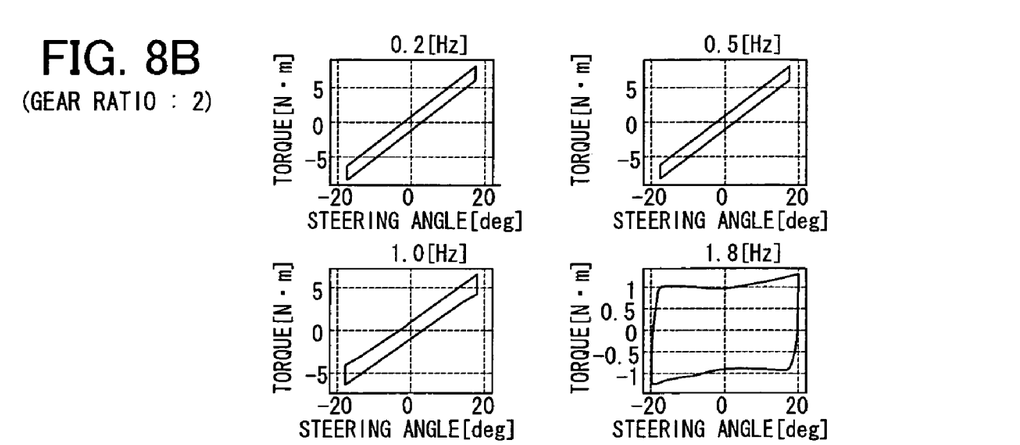
Figure 8C:
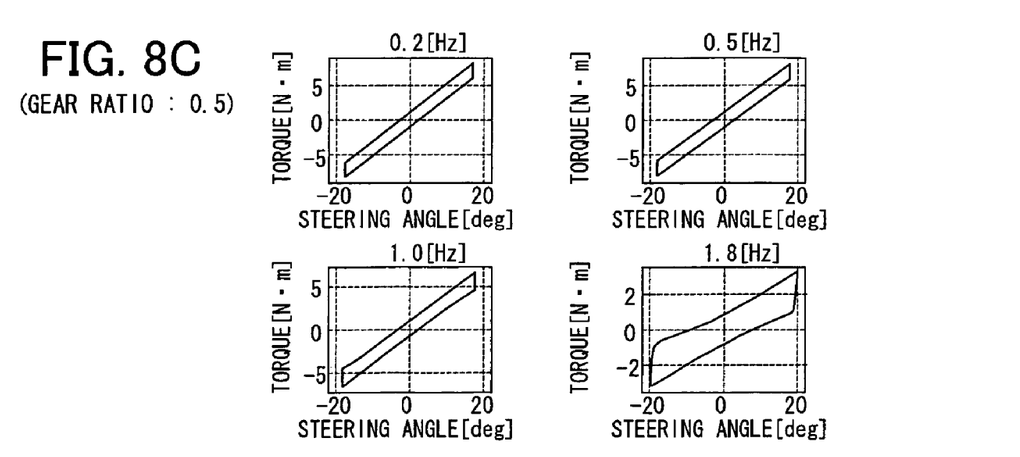

The wave forms of Lissajours figure are shown in FIGS. 8A to 8C, when the variable gear transmission system 10 and the electrical power steering system 11 are controlled by the control device of the comparison example 2. Since the control device of the comparison example 2 has the interference reducing portion 22, as explained above, it is understood from FIGS. 8A to 8C that each gradient of the long axes for the wave forms of Lissajours figure is kept as the ever-increasing form in the frequency range (0.2 Hz to 1.8 Hz) of the steering operation, independently from the gear ratio.

However, since the target torque "$T_{snref}$" is calculated in the way that the constant weight is used instead of the frequency weight $G_c(s)$, the steering torque "$T_s$" becomes larger, and thereby the steering operation becomes heavy.

Figure 9A:
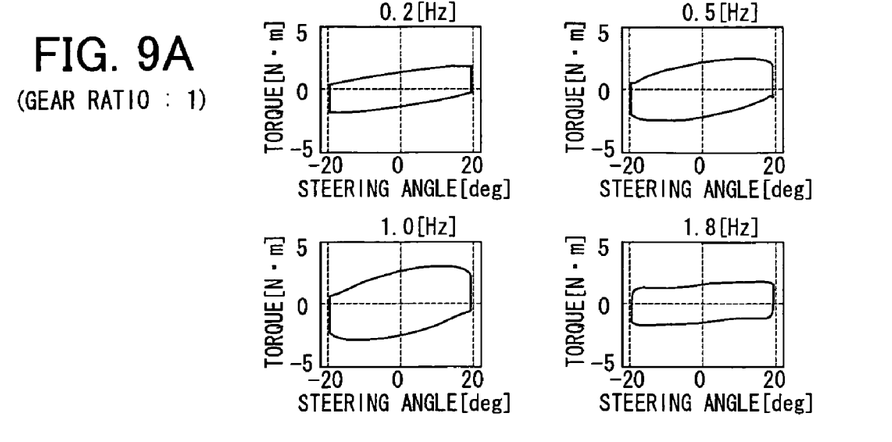
FIGS. 9A to 9C are graphs respectively showing wave forms of Lissajours figure, in which steering torques "$T_s$" and steering angles "$\theta_s$" are plotted in a phase plane, when the control device 100 calculates the target torque "$T_{snref}$" in accordance with the formula 3.
Figure 9B:
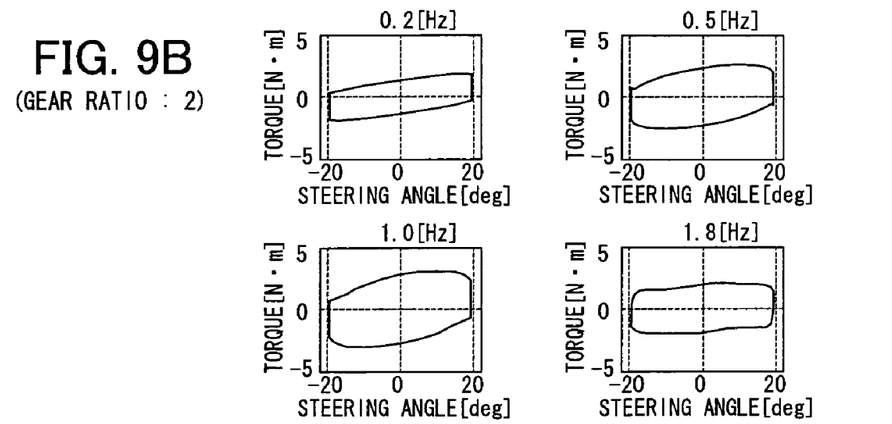
Figure 9C:
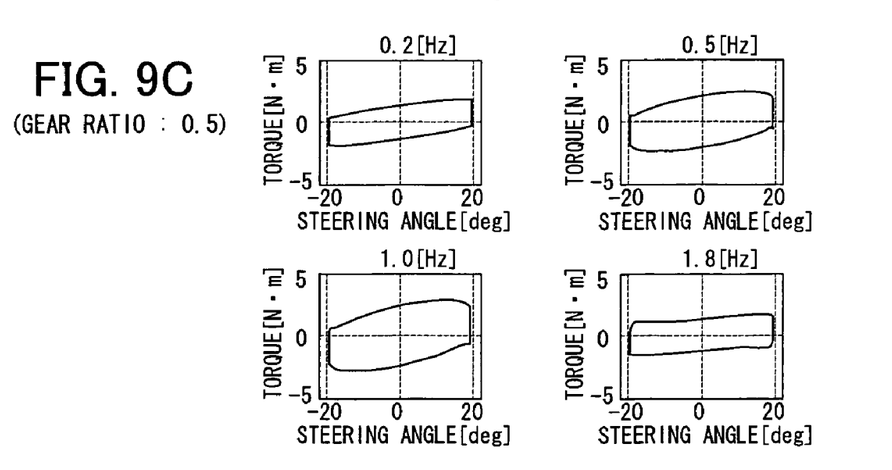

The wave forms of Lissajours figure are shown in FIGS. 9A to 9C, in the case that the target torque "$T_{snref}$" is calculated in accordance with the formula 3. The weight is more delicately adjusted when calculating the target torque "$T_{snref}$" in accordance with the formula 3, so that all of the gradients of the long axes for the wave forms of Lissajours figure are made as the ever-increasing form, and that the wave forms of Lissajours figure are made to be almost the same forms in the corresponding gear ratios. Accordingly, the operation sensitivity for the steering wheel is further improved in the case of FIGS. 9A to 9C as compared to the case of FIGS. 6A to 6C.

The invention is not limited to the above explained embodiment, but may be modified in various ways without departing from the spirit of the invention.

For example, the above electrical power steering system 11 is of the pinion type, in which the auxiliary steering torque is applied from the electric motor 2 to the pinion shaft 9. However, a column type may be used, in which the auxiliary steering torque is applied to a steering column, or a rack type may be used, in which the auxiliary steering torque is applied to a rack shaft.

In the above embodiment, the common control device 100 is provided for the variable gear transmission system 10 and the electrical power steering system 11. However, in view of failsafe, control devices may be separately provided for the variable gear transmission system 10 and the electrical power steering system 11, and necessary information may be exchanged between them via any communication device. According to such a modification, even when one of the control devices becomes out of operation, the other control device may continuously carry out its control operation to of the variable gear transmission system 10 and the electrical power steering system 11.

What is claimed is:

1. A steering system for a vehicle comprising:
    a variable gear transmission system for changing ratio ($\theta_o/\theta_s$) for a steered angle of a vehicle wheel with respect to a steering angle ($\theta_s$) of a steering wheel, in accordance with a rotation angle ($\theta_g$) of a first electric motor;
    an electrical power steering system for generating an auxiliary steering torque by a second electric motor in accordance with a torque ($T_{sn}$) applied to a steering shaft device connected with the steering wheel; and
    a control device for controlling the variable gear transmission system and the electrical power steering system, wherein the control device comprises:
        a first calculating portion for setting a target gear ratio (z) for the variable gear transmission system and for calculating a first command value ($v_1$) for the rotation angle of the first electric motor, such that an actual gear ratio coincides with the target gear ratio (z);
        a second calculating portion for setting a target torque ($T_{snref}$) to be generated at the electrical power steering system, and for calculating a second command value ($v_2$) for the torque generated by the second electric motor such that the auxiliary steering torque generated by the second electric motor coincides with the target torque ($T_{snref}$);
        a first output portion for generating a first compensation amount based on a first mathematical model, so that an influence of the interference to be applied to the rotation angle ($\theta_g$) of the first electric motor is reduced when the second electric motor is driven by the second command value ($v_2$) calculated by the second calculating portion, the first output portion calculating a first compensation command signal ($i_{gref}$) by adding the first compensation amount to the first command value ($v_1$), so that the first compensation command signal ($i_{gref}$) is applied to the first electric motor; and
        a second output portion for generating a second compensation amount based on the first mathematical model, so that an influence of the interference to be applied to the torque ($T_{sn}$) of the steering shaft device is reduced when the first electric motor is driven by the first command value ($v_1$) calculated by the first calculating portion, the second output portion calculating a second compensation command signal ($i_{pref}$) by adding the second compensation amount to the second command value ($v_2$), so that the second compensation command signal is applied to the second electric motor;
    wherein the first and second output portions calculate corrected amounts by substituting the first and second command values ($v_1$, $v_2$) calculated by the first and second calculating portions into a second mathematical model, and the first and second output portions calculate the first and second compensation command signal ($i_{gref}$, $i_{pref}$) by respectively adding the first and second compensation amounts to the above corrected amounts.

2. A steering system according to claim 1, wherein the first and second compensation amounts are generated by substituting condition amounts of the steering system into the first mathematical model, wherein the condition amounts correspond to such condition amounts of the steering system from the steering wheel to a transmitting shaft for the vehicle wheel, and the condition amounts are represented by the steering angle ($\theta_s$) of the steering wheel, the rotation angle ($\theta_g$) of the electric motor, and a rotation angle of the transmitting shaft for the vehicle wheel.

3. A steering system for a vehicle comprising:
    a variable gear transmission system for changing a gear ratio ($\theta_o/\theta_s$) for a steered angle of a vehicle wheel with respect to a steering angle ($\theta_s$) of a steering wheel, in accordance with a rotation angle ($\theta_g$) of a first electric motor;
    an electrical power steering system for generating an auxiliary steering torque by a second electric motor in accordance with a torque ($T_{sn}$) applied to a steering shaft device connected with the steering wheel; and
    a control device for controlling the variable gear transmission system and the electrical power steering system, wherein the control device comprises:
        a first calculating portion for setting a target gear ratio (z) for the variable gear transmission system, and for calculating a first command value ($v_1$) for the rotation angle of the first electric motor, such that an actual gear ratio coincides with the target gear ratio (z);
        a second calculating portion for setting target torque ($T_{snref}$) to be generated at the electrical power steering system, and for calculating a second command value ($v_2$) for the torque generated by the second electric motor, such that the auxiliary steering torque generated by the second electric motor coincides with the target torque ($T_{snref}$);
        a first output portion for generating a first compensation amount based on a first mathematical model, so that an influence of the interference to be applied to the rotation angle ($\theta_g$) of the first electric motor is reduced when the second electric motor is driven by the second command value ($v_2$) calculated by the second calculating portion, the first output portion calculating a first compensation command signal ($i_{gref}$) by adding the first compensation amount to the first command value ($v_1$), so that the first compensation command signal ($i_{gref}$) is applied to the first electric motor; and
        a second output portion for generating a second compensation amount based on the first mathematical model, so that an influence of the interference to be applied to the torque ($T_{sn}$) of the steering shaft device is reduced when the first electric motor is driven by the first command value ($v_1$) calculated by the first calculating portion, the second output portion calculating a second compensation command signal ($i_{pref}$) by adding the second compensation amount to the second command value ($v_2$), so that the second compensation command signal is applied to the second electric motor;

wherein the second calculating portion calculates the target torque ($T_{snref}$) by integrating the steering angle ($θ_s$) of the steering wheel with a weight coefficient ($G_c(s)$), wherein the weight coefficient ($G_c(s)$) becomes larger as a steering speed of the steering wheel increases.

* * * * *